UNITED STATES PATENT OFFICE.

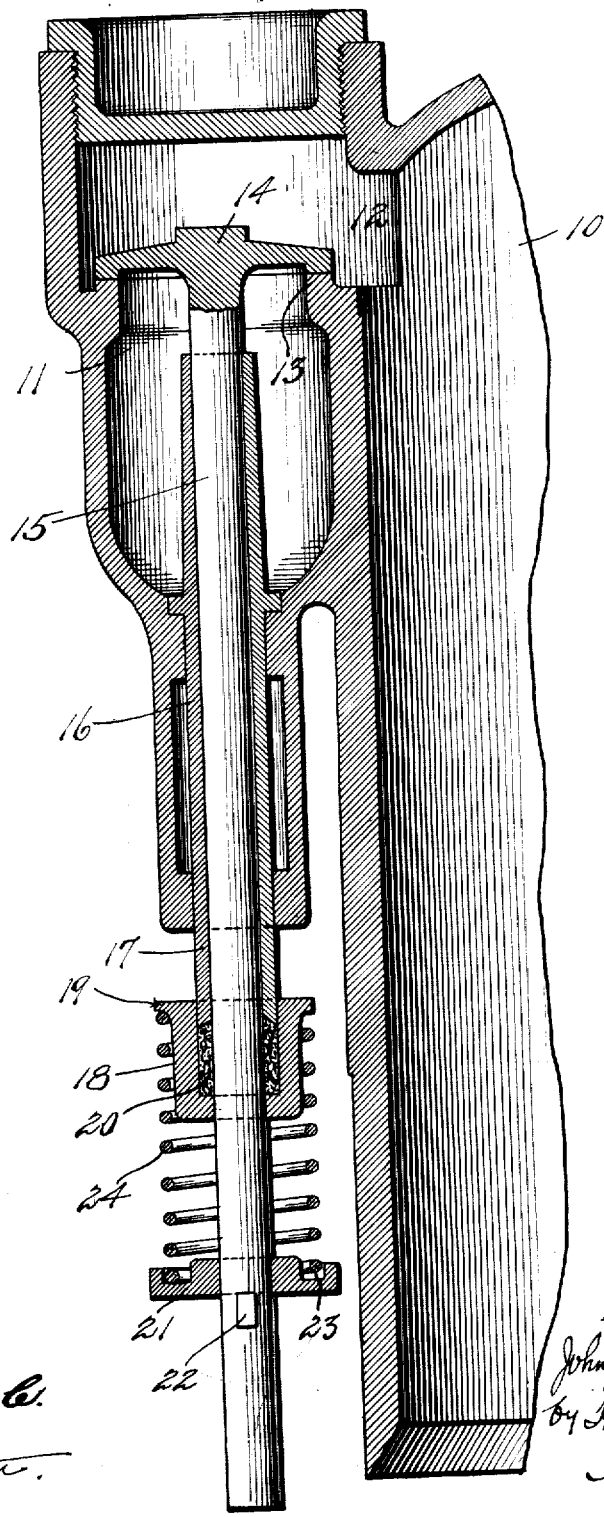

JOHN J. MacMULKIN, OF HUNTINGTON, NEW YORK, ASSIGNOR OF ONE-FOURTH TO HENRY U. PALMER AND ONE-FOURTH TO CHARLES A. SINGER, OF NEW YORK, N. Y.

STUFFING-BOX FOR ENGINE-VALVES.

No. 904,790.　　　Specification of Letters Patent.　　　Patented Nov. 24, 1908.

Application filed March 10, 1908. Serial No. 420,138.

*To all whom it may concern:*

Be it known that I, JOHN J. MACMULKIN, of Huntington, Long Island, a citizen of the United States, and a resident of Huntington, Long Island, in the county of Suffolk and State of New York, have invented certain new and useful Improvements in Stuffing-Boxes for Engine-Valves, of which the following is a specification.

The present invention consists of certain new and useful improvements in stuffing boxes for engine valves, and relates especially to stuffing boxes for use in connection with inlet valves for gasolene engines.

The principal object of the invention is to provide a stuffing box in which the packing contained therein is constantly under pressure and which is adapted to be automatically compressed each time the valve is opened.

Other objects of the invention will be apparent from the following detailed description, pointed out in the claims, and illustrated in the accompanying drawing.

In the accompanying drawing I have shown the invention in a longitudinal sectional view, a portion of the engine cylinder being also shown.

Referring to the drawing, 10 designates an engine cylinder provided with an inlet valve chamber 11 which communicates with said cylinder 10 through a port 12.

A valve seat 13 is formed within the valve chamber 11 for a valve 14. Said valve 14 is provided with a stem 15. A guide sleeve 16 for the said valve stem 15 is located within the inlet valve chamber, and terminates in a gland extension 17, which extends beyond one end of the said valve chamber.

A cup-shaped stuffing box 18 is loosely mounted on the valve stem 15 in a position to receive the outer end of the gland extension 17. Said stuffing box is provided with an outwardly extending abutment flange 19. Within the stuffing box suitable packing 20 is placed.

An abutment washer 21 is connected with the valve stem 11 by means of a key 22. Said abutment washer is provided with a seat 23 for one end portion of a valve spring 24 that is coiled around the valve stem 15 between said abutment washer 21 and the abutment flange 19 of the cup-shaped stuffing box 18.

The operation of the invention is as follows:—When the inlet valve is in its normal, or closed position, as shown in the drawing, it will be observed that, as the gland extension 17 is within the stuffing box 18 and bearing against the packing 20, a constant pressure is being exerted against said stuffing box 18 by means of the interposed valve spring 24. Now when the valve stem 15 is moved to open the valve 14, the spring 24 will be compressed, and then such additional pressure will be imparted to the stuffing box, as to cause its packing to hammer against the gland extension, tending to compress and tighten the said packing. On the reverse movement of the valve stem, the spring assumes its normal, or distended position, but of course, retains the stuffing box in a position where its packing will be in constant contact with the gland extension.

The invention is of special utility in connection with the inlet valves of gasolene engines. In such structures it is essential that there be no leak around the valve stem that would permit air to enter the engine when the mixture is being admitted. In the present invention it will be seen that a structure has been produced in which the force of the valve spring is used to maintain a tight joint between the end of the gland and the packing, and that as the valve stem is moved to open its valve, the packing will be hammered by the gland which causes a compression of the said packing, and such packing is retained in its compressed state after the valve has been closed by means of the constant pressure exerted by the valve spring against the stuffing box. And as the above described operation is performed each time the valve is opened, it will be seen that an absolutely air-tight connection is maintained between the stuffing box and gland.

I claim as my invention:—

1. A device of the character described comprising a valve chamber having a valve therein, a stem for said valve projecting beyond said valve chamber, a spring-pressed stuffing box mounted on the projected portion of said stem, and a gland for said valve stem mounted in said valve chamber and having an exteriorly projecting end portion that extends into said stuffing box.

2. A device of the character described comprising a valve chamber having a valve therein, a stem for said valve which projects beyond said valve chamber, a gland in said valve chamber surrounding said valve stem and having one end projected beyond the valve chamber, a washer carried by the projected end of the valve stem, a coiled spring seated on the washer, and a stuffing box loosely surrounding said stem and held in engagement with the projected end of the gland by said spring, whereby a movement of said stem causes the end of the gland to compress the packing in said box.

Signed at Huntington, in the county of and State of New York, this 2nd day of March A. D. 1908.

JOHN J. MacMULKIN.

Witnesses:
 JOHN MILLIGAN,
 E. V. REILLY.